(12) United States Patent
Heneveld

(10) Patent No.: US 10,907,480 B2
(45) Date of Patent: Feb. 2, 2021

(54) RIBBED PIN FINS

(71) Applicant: United Technologies Corporation, Farmington, CT (US)

(72) Inventor: Benjamin Heneveld, Arlington, MA (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 104 days.

(21) Appl. No.: 16/146,385

(22) Filed: Sep. 28, 2018

(65) Prior Publication Data

US 2020/0102839 A1    Apr. 2, 2020

(51) Int. Cl.
 *F01D 5/18*   (2006.01)
 *B33Y 10/00*  (2015.01)
 *B33Y 80/00*  (2015.01)

(52) U.S. Cl.
 CPC .............. *F01D 5/187* (2013.01); *B33Y 10/00* (2014.12); *B33Y 80/00* (2014.12); *F05D 2230/31* (2013.01); *F05D 2240/301* (2013.01); *F05D 2240/81* (2013.01); *F05D 2250/181* (2013.01); *F05D 2250/231* (2013.01); *F05D 2250/292* (2013.01); *F05D 2260/22141* (2013.01)

(58) Field of Classification Search
 CPC . F01D 5/18; F01D 5/186; F01D 5/187; F05D 2260/22141; F28F 3/02; F28F 3/022
 See application file for complete search history.

(56) References Cited

U.S. PATENT DOCUMENTS

| | | | | |
|---|---|---|---|---|
| 4,292,647 A * | 9/1981 | Lee | ........................ | H01L 23/367 165/80.3 |
| 4,638,858 A * | 1/1987 | Chu | ........................ | F28F 13/12 165/181 |
| 6,244,331 B1 * | 6/2001 | Budelman | ................ | F28F 3/022 165/121 |
| 6,598,781 B2 * | 7/2003 | Hasz | ........................ | B32B 15/01 228/245 |
| 6,619,382 B1 * | 9/2003 | Ichigaya | ................. | A41D 27/28 165/185 |
| 6,736,204 B2 * | 5/2004 | Gollan | ................... | C25D 5/022 165/133 |

(Continued)

FOREIGN PATENT DOCUMENTS

| | | | | |
|---|---|---|---|---|
| EP | 0883179 A2 * | 12/1998 | ......... | H01L 23/3677 |
| EP | 3034791 A1 | 6/2016 | | |

(Continued)

OTHER PUBLICATIONS

European Search Report Application No. EP19200104; dated Feb. 3, 2020; pp. 5.

*Primary Examiner* — Michael Lebentritt
*Assistant Examiner* — Topaz L. Elliott
(74) *Attorney, Agent, or Firm* — Cantor Colburn LLP

(57) ABSTRACT

A blade body of a turbine blade, which defines an interior cavity fluidly communicative with coolant, is provided. The blade body includes an interior surface and one or more pins extending from the interior surface. The interior surface and the one or more pins are disposable to thermally interact with the coolant. At least one of the one or more pins includes a first section and a second section interposed between the first section and the interior surface. The first section has a larger cross-sectional area than the second section.

15 Claims, 6 Drawing Sheets

(56) References Cited

U.S. PATENT DOCUMENTS

| | | | | |
|---|---|---|---|---|
| 6,807,059 B1* | 10/2004 | Dale | | H01L 21/4882 |
| | | | | 165/185 |
| 8,266,802 B2* | 9/2012 | Campbell | | H01L 23/4735 |
| | | | | 165/80.3 |
| 8,297,926 B2* | 10/2012 | Groβ | | F01D 5/187 |
| | | | | 416/96 R |
| 8,894,367 B2* | 11/2014 | Lee | | F01D 5/187 |
| | | | | 416/96 R |
| 9,206,695 B2* | 12/2015 | Pointon | | F01D 5/186 |
| 9,243,502 B2* | 1/2016 | Xu | | B23K 26/342 |
| 9,297,261 B2* | 3/2016 | Otero | | F01D 5/187 |
| 9,417,017 B2* | 8/2016 | Ciulla | | F04B 43/046 |
| 9,771,809 B2* | 9/2017 | Fujimoto | | F01D 5/189 |
| 9,796,048 B2* | 10/2017 | Lacy | | F01D 9/065 |
| 9,903,209 B2 | 2/2018 | Krueckels et al. | | |
| 9,920,635 B2* | 3/2018 | Bommisetty | | F01D 5/188 |
| 9,957,812 B2* | 5/2018 | Okita | | F23R 3/005 |
| 10,196,900 B2* | 2/2019 | King | | F01D 5/186 |
| 10,247,099 B2* | 4/2019 | Quach | | F01D 5/187 |
| 2001/0027855 A1* | 10/2001 | Budelman | | F28F 3/022 |
| | | | | 165/80.3 |
| 2003/0094265 A1* | 5/2003 | Chu | | F28F 3/022 |
| | | | | 165/133 |
| 2003/0136547 A1* | 7/2003 | Gollan | | C25D 5/022 |
| | | | | 165/104.21 |
| 2006/0191675 A1* | 8/2006 | Fletcher | | F28F 3/022 |
| | | | | 165/172 |
| 2009/0314467 A1* | 12/2009 | Campbell | | H01L 23/4735 |
| | | | | 165/80.4 |
| 2010/0239432 A1 | 9/2010 | Liang | | |
| 2011/0297361 A1* | 12/2011 | Carbone | | F28F 3/022 |
| | | | | 165/185 |
| 2013/0232991 A1* | 9/2013 | Otero | | F01D 5/187 |
| | | | | 60/806 |
| 2013/0280092 A1* | 10/2013 | Xu | | B22F 3/1055 |
| | | | | 416/97 R |
| 2014/0060783 A1* | 3/2014 | Ciulla | | F04B 43/046 |
| | | | | 165/109.1 |
| 2014/0290256 A1* | 10/2014 | Fujimoto | | F01D 5/189 |
| | | | | 60/752 |
| 2014/0290257 A1* | 10/2014 | Okita | | F01D 5/189 |
| | | | | 60/752 |
| 2016/0025010 A1* | 1/2016 | Soucy | | F02C 7/24 |
| | | | | 60/806 |
| 2016/0059437 A1* | 3/2016 | Lacy | | F28F 13/08 |
| | | | | 228/164 |
| 2016/0169000 A1* | 6/2016 | King | | F01D 5/186 |
| | | | | 415/115 |
| 2016/0230664 A1* | 8/2016 | Quach | | F01D 5/187 |
| 2016/0320149 A1* | 11/2016 | Poltorak | | F28F 13/12 |
| 2017/0136525 A1* | 5/2017 | Neale | | B22C 9/10 |
| 2017/0138204 A1 | 5/2017 | Jimbo et al. | | |
| 2017/0145834 A1* | 5/2017 | Lewis | | F01D 5/187 |
| 2017/0152748 A1* | 6/2017 | Kasperski | | B22C 9/10 |
| 2017/0167274 A1* | 6/2017 | Itzel | | F01D 25/12 |
| 2018/0156041 A1 | 6/2018 | Clark et al. | | |
| 2018/0306038 A1* | 10/2018 | Lewis | | F01D 5/187 |
| 2020/0003120 A1* | 1/2020 | Heneveld | | F23R 3/005 |
| 2020/0018182 A1* | 1/2020 | Whitaker | | F01D 5/187 |

FOREIGN PATENT DOCUMENTS

| | | | | |
|---|---|---|---|---|
| JP | 02073697 A | * | 3/1990 | F28F 3/022 |
| JP | 03214762 A | * | 9/1991 | |
| JP | 06061667 A | * | 3/1994 | F28F 3/022 |
| JP | 2014220365 A | | 11/2014 | |
| JP | 2015062183 A | * | 4/2015 | F28F 3/022 |
| WO | WO-02056660 A2 | * | 7/2002 | H01L 23/473 |

* cited by examiner

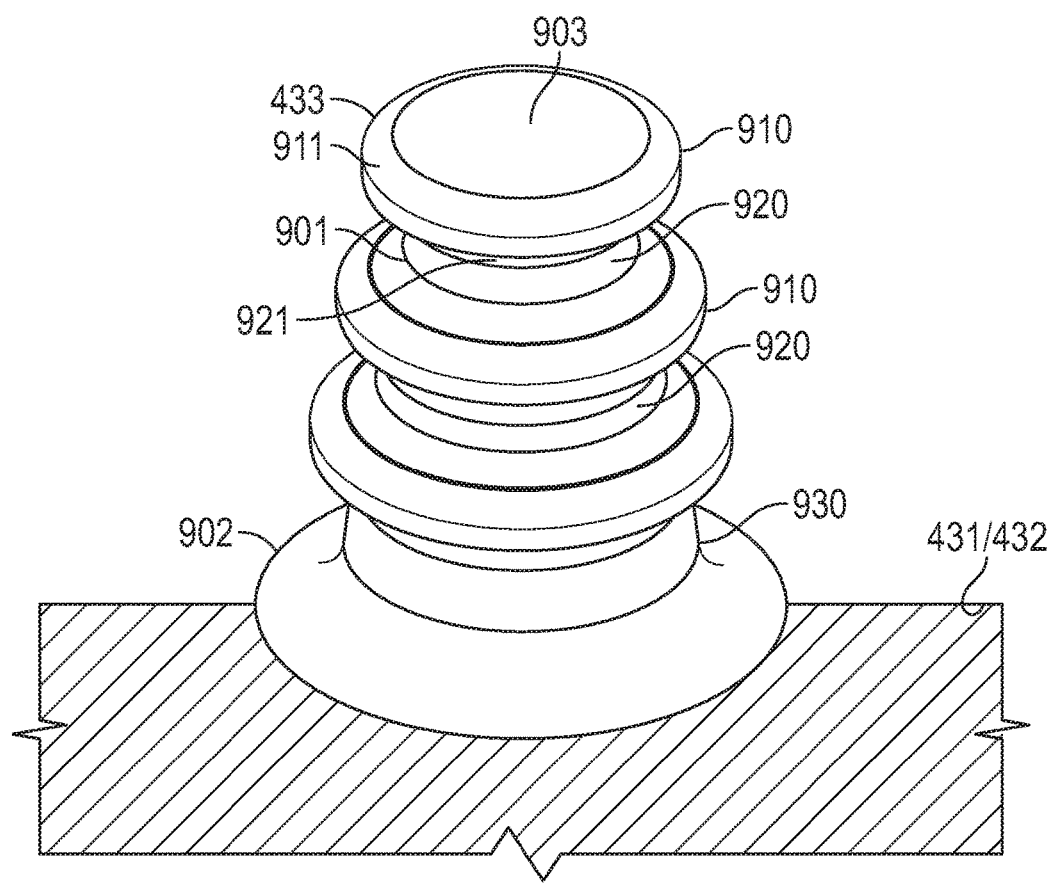
FIG. 9
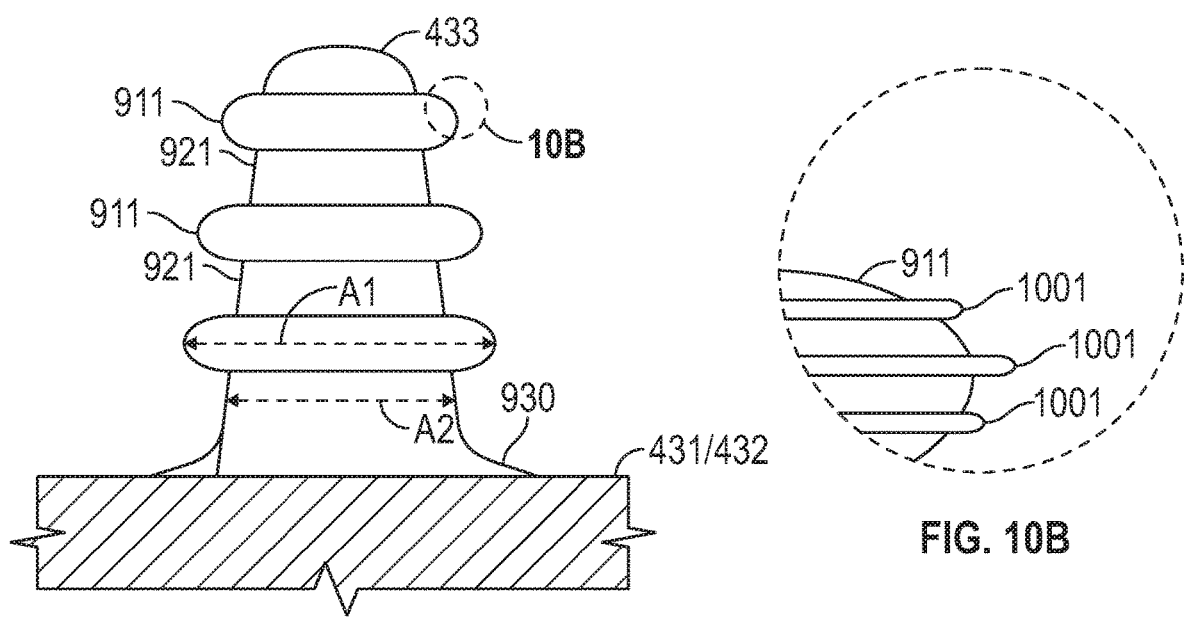
FIG. 10A
FIG. 10B

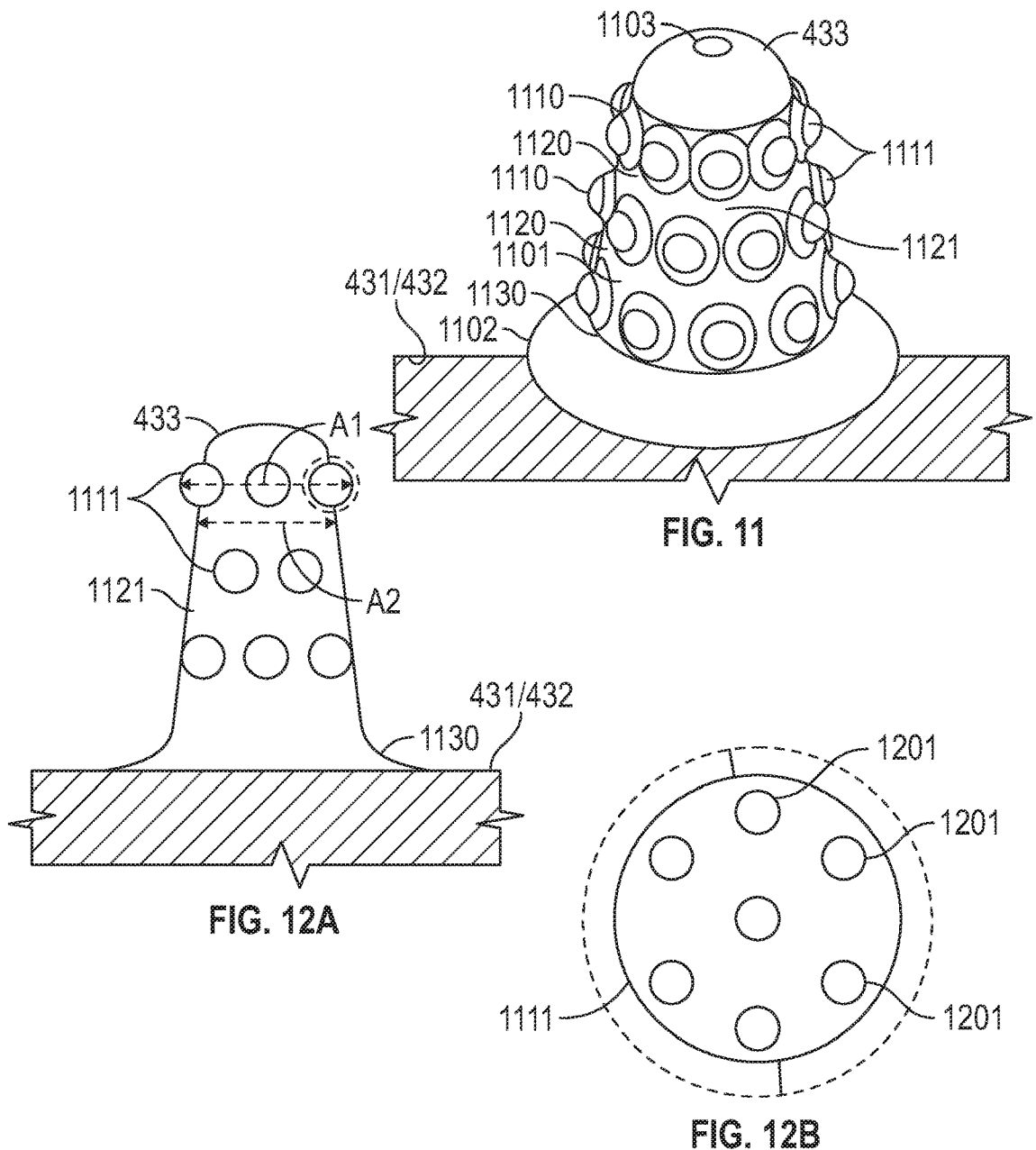

RIBBED PIN FINS

BACKGROUND

Exemplary embodiments of the present disclosure relate generally to gas turbine engines and, in one embodiment, to ribbed pin fins for turbine blades of gas turbine engines.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Thermal efficiency and power output of gas turbine engines increase with increasing turbine rotor inlet temperatures (RITs). Thus, increasing an RIT of a gas turbine engine is one of the key challenges in raising a performance level of the gas turbine engine.

In some cases, the RIT is far higher than the melting point of turbine blade materials within the turbine section of typical gas turbine engines and in such cases, the turbine blades need to be cooled. In these or other cases, where turbine blade cooling is successful, it becomes possible to substantially raise RIT. Thus, one way to provide for an increased RIT is through the implementation of sophisticated turbine blade cooling systems and methods.

Since the heat transfer rate from convection cooling scales with the surface area available for heat transfer, one way to provide for more sophisticated turbine blade cooling systems and methods is by increasing the surface area for heat transfer. To this end, cooling via pin-fin arrays is a well-known method of increasing the surface area available for heat transfer. This understanding has been coupled with the recognition that the geometry of pins in a pin-fin array has traditionally been limited to that which can be demolded using conventional pull planes thereby preventing the use of protruding undercuts which could further increase the surface area available for heat transfer.

BRIEF DESCRIPTION

According to an aspect of the disclosure, a blade body of a turbine blade, which defines an interior cavity fluidly communicative with coolant, is provided. The blade body includes an interior surface and one or more pins extending from the interior surface. The interior surface and the one or more pins are disposable to thermally interact with the coolant. At least one of the one or more pins includes a first section and a second section interposed between the first section and the interior surface. The first section has a larger cross-sectional area than the second section.

In accordance with additional or alternative embodiments, the blade body includes an exterior surface fluidly communicative with combustion products of a gas turbine engine.

In accordance with additional or alternative embodiments, the interior surface includes first and second interior surfaces.

In accordance with additional or alternative embodiments, the one or more pins extend between the first and second interior surfaces in a pin array.

In accordance with additional or alternative embodiments, the one or more pins extend as a first set of pins from the first interior surface in a first pin array and as a second set of pins from the second interior surface in a second pin array.

In accordance with additional or alternative embodiments, the at least one of the one or more pins includes a cylindrical or tapered cylindrical exterior surface and a rib protruding from a local plane of the cylindrical or the tapered cylindrical exterior surface.

In accordance with additional or alternative embodiments, the at least one of the one or more pins includes a cylindrical or tapered cylindrical exterior surface and multiple ribs protruding from a local plane of the cylindrical or the tapered cylindrical exterior surface along an axial length thereof.

In accordance with additional or alternative embodiments, the at least one of the one or more pins includes a cylindrical or tapered cylindrical exterior surface and a protrusion protruding from a local plane of the cylindrical or the tapered cylindrical exterior surface.

In accordance with additional or alternative embodiments, the at least one of the one or more pins includes a cylindrical or tapered cylindrical exterior surface and multiple protrusions protruding in multiple rows from a local plane of the cylindrical or the tapered cylindrical exterior surface along an axial length thereof.

According to another aspect of the disclosure, a turbine blade is provided and includes a platform, a root extending radially inwardly from the platform and a blade body extending radially outwardly from the platform. At least the blade body defines an interior cavity fluidly communicative with coolant, the blade body includes an interior surface and one or more pins extending from the interior surface, the interior surface and the one or more pins are disposable to thermally interact with the coolant and at least one of the one or more pins includes a first section and a second section interposed between the first section and the interior surface with the first section having a larger cross-sectional area than the second section.

In accordance with additional or alternative embodiments, the platform, the root and the blade body define the interior.

In accordance with additional or alternative embodiments, the blade body includes an exterior surface fluidly communicative with combustion products of a gas turbine engine.

In accordance with additional or alternative embodiments, the blade body includes first and second interior surfaces and the one or more pins extend between the first and second interior surfaces in a pin array.

In accordance with additional or alternative embodiments, the blade body includes first and second interior surfaces and the one or more pins extend as a first set of pins from the first interior surface in a first pin array and as a second set of pins from the second interior surface in a second pin array.

In accordance with additional or alternative embodiments, the at least one of the one or more pins includes a cylindrical or tapered cylindrical exterior surface and a rib protruding from a local plane of the cylindrical or the tapered cylindrical exterior surface.

In accordance with additional or alternative embodiments, the at least one of the one or more pins includes a cylindrical or tapered cylindrical exterior surface and multiple ribs protruding from a local plane of the cylindrical or the tapered cylindrical exterior surface along an axial length thereof.

In accordance with additional or alternative embodiments, the at least one of the one or more pins includes a cylindrical or tapered cylindrical exterior surface and a protrusion protruding from a local plane of the cylindrical or the tapered cylindrical exterior surface.

In accordance with additional or alternative embodiments, the at least one of the one or more pins includes a cylindrical or tapered cylindrical exterior surface and multiple protrusions protruding in multiple rows from a local plane of the cylindrical or the tapered cylindrical exterior surface along an axial length thereof.

According to another aspect of the disclosure, a method of building a blade body of a turbine blade is provided and includes manufacturing an interior surface and manufacturing one or more pins to extend from the interior surface. The interior surface and the one or more pins are disposable to thermally interact with coolant directed through an interior of the blade body. At least one of the one or more pins are manufactured to include a first section and a second section interposed between the first section and the interior surface with the first section having a larger cross-sectional area than the second section.

In accordance with additional or alternative embodiments, the manufacturing of the at least one of the one or more pins includes manufacturing the at least one of the one or more pins to include a cylindrical or tapered cylindrical exterior surface and at least one of a rib protruding from a local plane of the cylindrical or the tapered cylindrical exterior surface, multiple ribs protruding from the local plane of the cylindrical or the tapered cylindrical exterior surface along an axial length thereof, a protrusion protruding from the local plane of the cylindrical or the tapered cylindrical exterior surface and multiple protrusions protruding in multiple rows from the local plane of the cylindrical or the tapered cylindrical exterior surface along the axial length thereof.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 9 is a perspective view of a pin having additively manufactured ribs in accordance with embodiments;

FIG. 10A is a side view of the pin of FIG. 9;

FIG. 10B is an enlarged view of the encircled portion of FIG. 10A;

FIG. 11 is a perspective view of a pin having multiple additively manufactured protrusions protruding in multiple rows in accordance with embodiments;

FIG. 12A is a side view of the pin of FIG. 9;

FIG. 12B is an enlarged view of the encircled portion of FIG. 12A; and

FIG. 13 is a flow diagram illustrating a method of building a blade body of a turbine blade in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
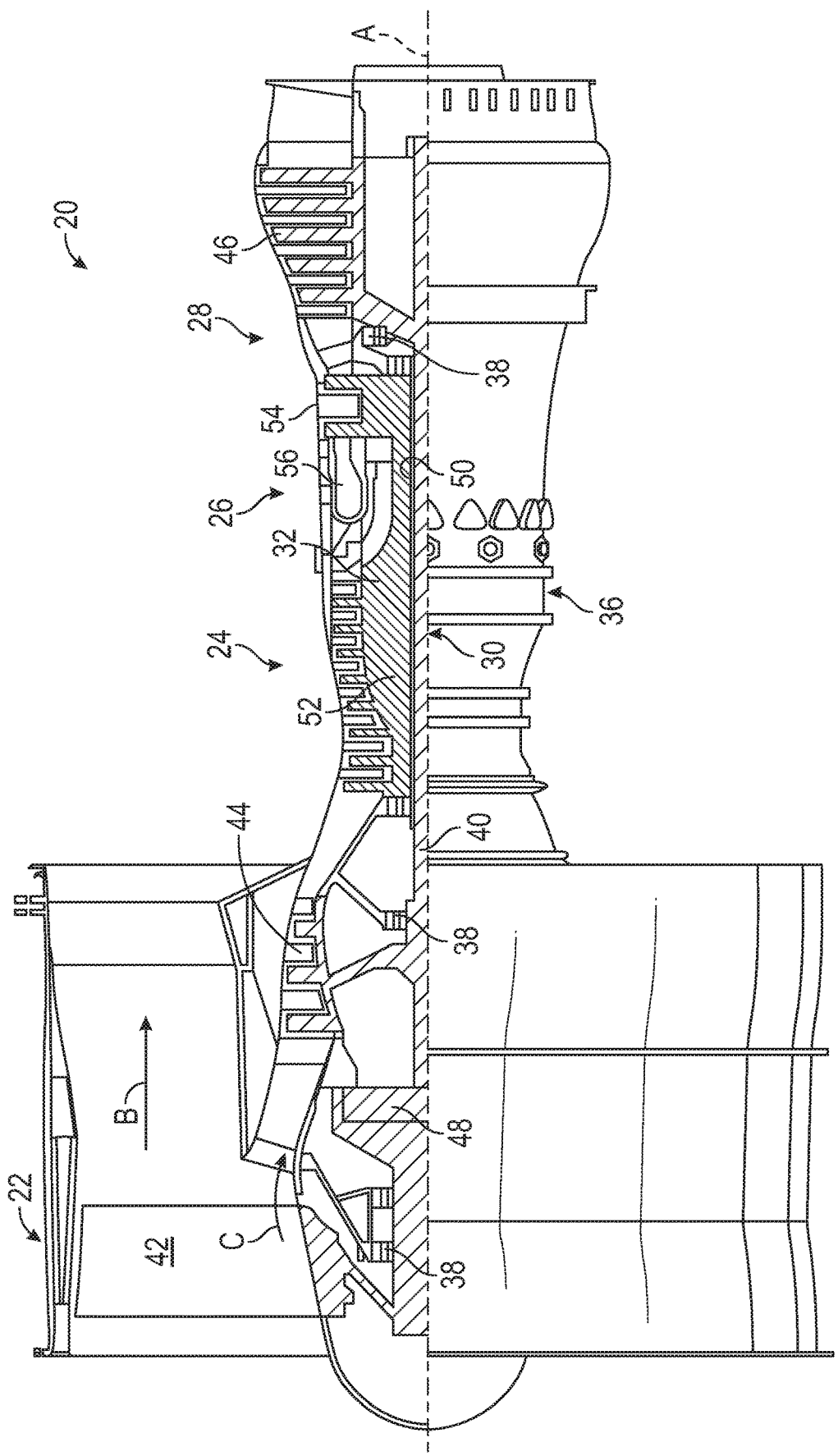
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second (350.5 m/sec).

Figure 2:
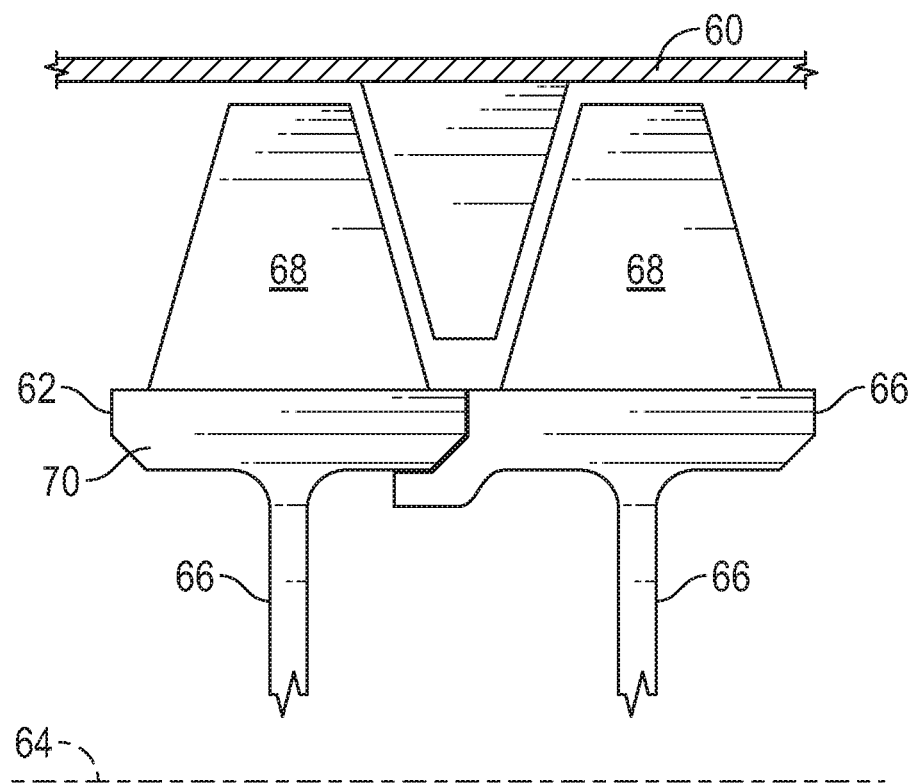
FIG. 2 is a partial cross-sectional view of an embodiment of a portion of a compressor section of the gas turbine engine of FIG. 1.

Referring now to FIG. 2, either or both of the low pressure compressor 44 or the high pressure compressor 52 includes a compressor case 60, in which compressor rotors 62 are arranged along an engine axis 64 about which the compressor rotors 62 rotate. Each compressor rotor 62 includes a rotor disc 66 with a platform 70 and a plurality of rotor blades 68 extending radially outwardly from the platform 70 (i.e., a rotor stack). In some embodiments, the rotor disc 66 and the plurality of rotor blades 68 are a single, unitary structure, an integrally bladed compressor rotor 62. In other embodiments, the rotor blades 68 are each installed to the rotor disc 66 via, for example, a dovetail joint where a tab or protrusion at the rotor blade 68 is inserted into a corresponding slot in the platform 70.

Figure 3:
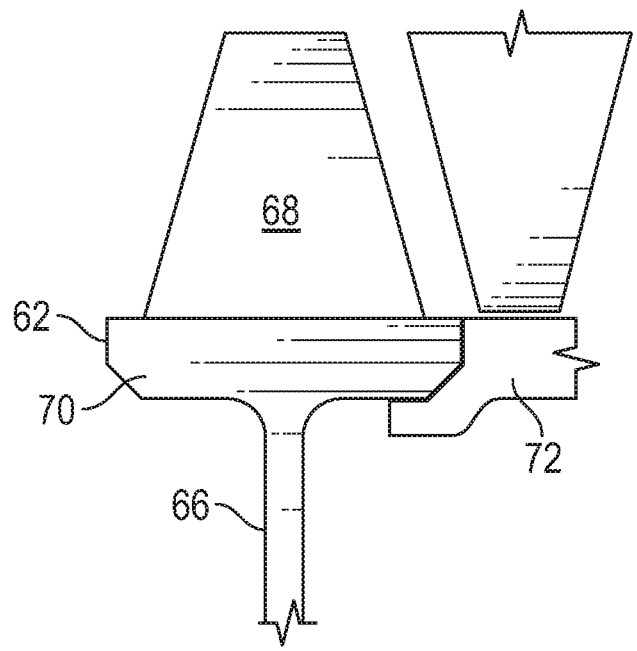
FIG. 3 is a partial cross-sectional view of another embodiment of a portion of a compressor section of the gas turbine engine of FIG. 1.

As shown in FIG. 2, axially adjacent compressor rotors 62 may be joined to each other, while in other embodiments, as shown in FIG. 3, the compressor rotor 62 may be joined to another rotating component, such as a spacer 72. The compressor rotor 62 is secured to the adjacent rotating component by an interference fit or a "snap fit," which in some embodiments is combined with another mechanical fastening, such as a plurality of bolts (not shown) to secure the components and to form or define a snap location.

As will be described below, advanced and additive manufacturing methods allow for advanced designs of pin-fin arrays for turbine blades. In particular, these designs feature protrusions that would otherwise be unfeasible to be fabricated using traditional methods.

Figure 4:
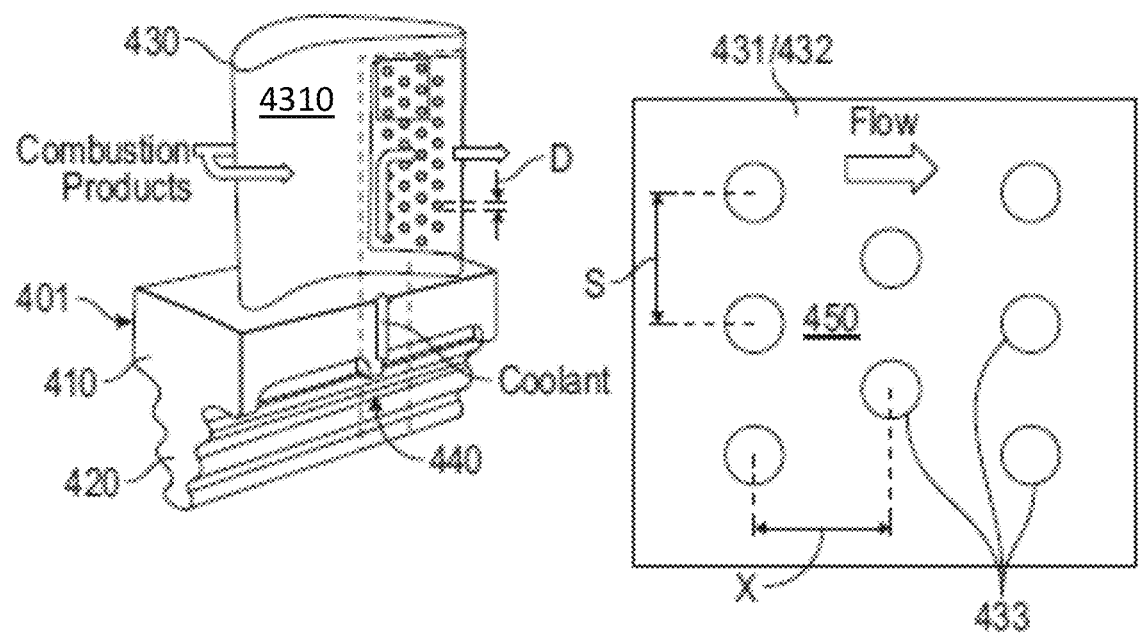
FIG. 4 is a perspective view of a turbine blade of a gas turbine engine in accordance with embodiments.

With reference to FIG. 4, a turbine blade 401 is provided and includes a platform 410, a root 420 extending radially inwardly from a first surface of the platform 410 and a blade body 430. The blade body 430 extends radially outwardly from a second surface of the platform 410 and has an exterior surface 4310 that, when the turbine blade 401 is installed in a gas turbine engine, such as the gas turbine engine 20 of FIGS. 1-3, aerodynamically interacts with combustion products. The exterior surface 4310 includes a leading edge, a trailing edge opposite the leading edge, a suction surface extending from the leading edge to the trailing edge and a pressure surface opposite the suction surface and extending from the leading edge to the trailing edge.

The platform 410, the root 420 and the blade body 430 are formed to define an interior cavity 440. The interior cavity 440 extends through the root 420, the platform 410 and the blade body 430 and is fluidly communicative with coolant. The interior cavity 440 is defined within the blade body 430 in order to provide cooling effects for the material of the blade body 430 so that a corresponding RIT can be maintained at a relatively high level or increased to in turn increase performance capabilities. In particular, the blade body 430 includes a first interior surface 431, a second interior surface 432 opposite the first interior surface 431 and one or more pins 433. The first and second interior surfaces 431 and 432 and the one or more pins 433 are disposable to thermally interact with the coolant. That is, each of the first and second interior surfaces 431 and 432 faces inwardly into the interior cavity 440 and the one or more pins 433 each extends through at least a portion of the interior cavity 440.

As shown in FIG. 4, the one or more pins 433 may be arranged in a pin array 450. The pin array 450 can be characterized, for example, as having a staggered formation with each of the one or more pins 433 disposed in rows and displaced from a neighbor in a row by a distance S with the rows being displaced from each other by a distance X.

For the purposes of clarity and brevity, the following description will relate to the case of the one or more pins 433 being provided as multiple pins 433.

Figure 5:
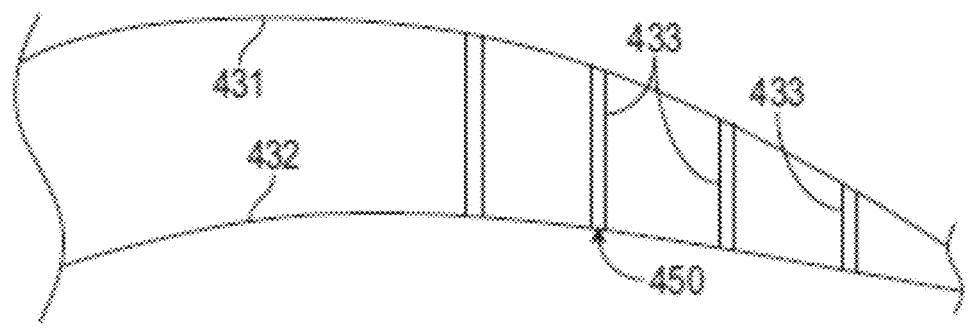
FIG. 5 is a cross-sectional view of a blade body of the turbine blade of FIG. 4.
Figure 6:
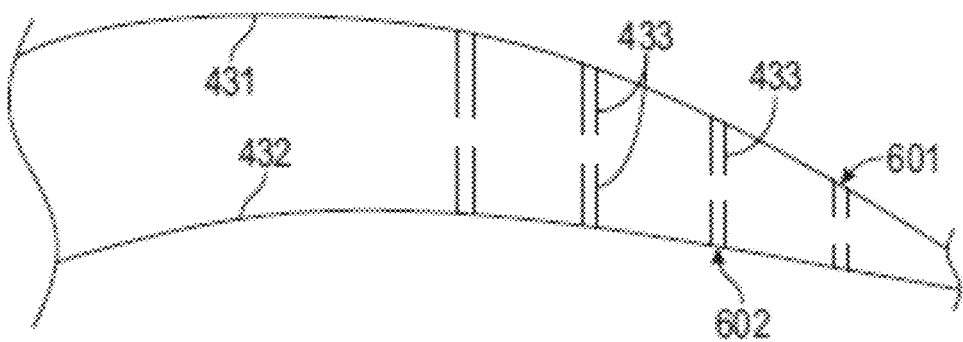
FIG. 6 is a cross-sectional view of a blade body of the turbine blade of FIG. 4.
Figure 7:
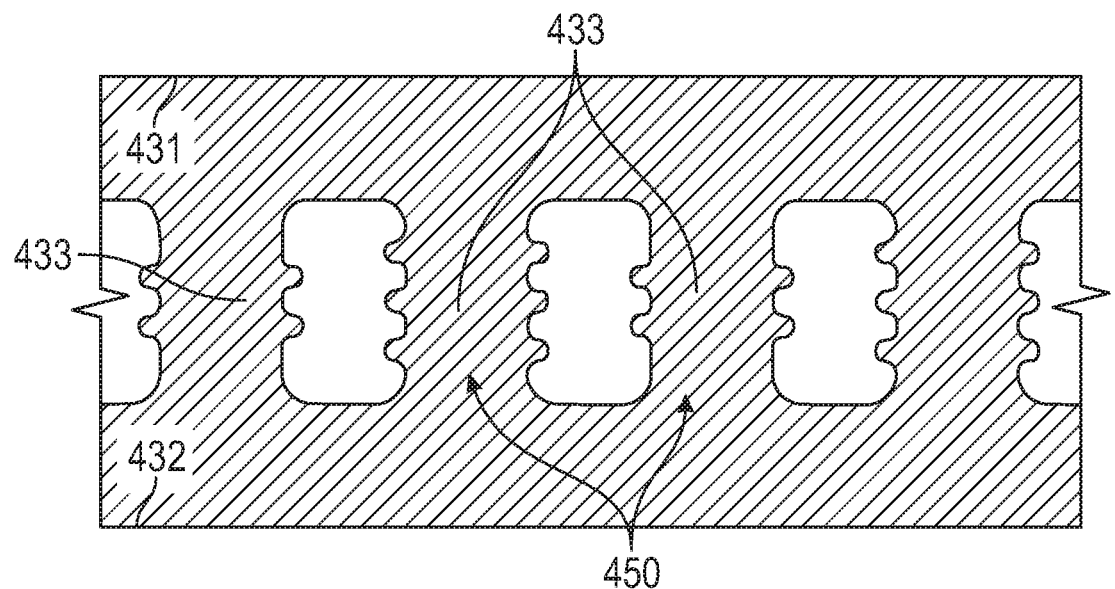
FIG. 7 is an enlarged cross-sectional view of a blade body with bridging pins in accordance with embodiments.
Figure 8:
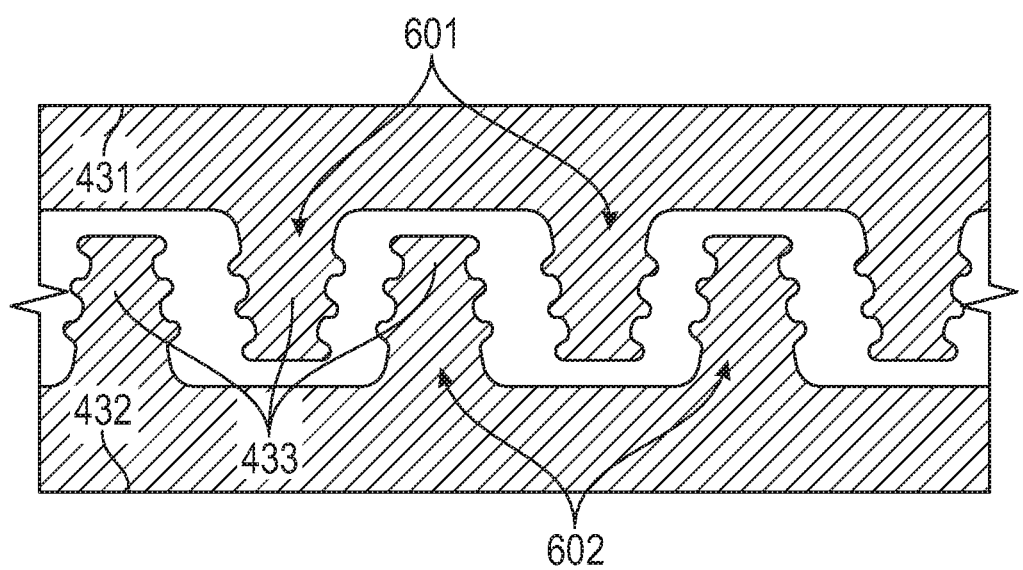
FIG. 8 is an enlarged cross-sectional view of a blade body with non-bridging pins in accordance with embodiments.

With reference to FIGS. 5 and 7, the pins 433 extend between the first and second interior surfaces 431 and 432 in the pin array 450 with a bridged configuration. With reference to FIGS. 6 and 8, the pins 433 are provided as first and second pin arrays 601 and 602 that extend in opposite directions from the first and second interior surfaces 431 and 432, respectively, in a non-bridged configuration.

With reference to FIGS. 9, 10A and 10B and to FIGS. 11, 12A and 12B, embodiments of the pins 433 will now be described. It is to be understood that, while the illustrations of FIGS. 9, 10A and 10B and FIGS. 11, 12A and 12B generally apply to the non-bridged configuration of FIGS. 6 and 8, this is merely exemplary and a person of ordinary skill in the art will easily recognize that the embodiments of FIGS. 9, 10A and 10B and FIGS. 11, 12A and 12B are applicable to the bridged configuration of FIGS. 5 and 7 as well.

As shown in FIGS. 9, 10A and 10B, the pins 433 have exterior surfaces 901 with an overall tapered cylindrical shape. That is, the pins 433 each have a relatively wide base 902 at the first or the second interior surface 431 or 432 and a relatively narrow distal tip 903 (in the case of the pins 433 having the bridged configuration of FIGS. 5 and 7, the exterior surfaces 901 of the pins 433 would have substantially cylindrical shapes). The distal tip 903 can be curved and blunt. In any case, the pins 433 include first sections 910, second sections 920 and a fillet 930 that is adjacent to the first or the second interior surface 431 or 432. Each second section 920 is interposed between an adjacent first section 910 and the first or the second interior surface 431 or 432 and the fillet 930. While the exterior surfaces 901 have an overall tapered cylindrical shape, the first sections 910 each have a larger circumscribed diameter or a cross-sectional area A1 locally than the circumscribed diameter or the cross-sectional area A2 of the adjacent second section 920 (see FIG. 10A). The different cross-sectional areas A1 and A2 can take the form of ribs and lands as will be described below.

In the embodiments of FIGS. 9, 10A and 10B, each first section 910 is provided as a rib 911 and each second section 920 is provided as a land 921 that effectively defines a local plane of the exterior surface 901. As such, each rib 911 effectively protrudes from the local plane of the exterior surface 901 and correspondingly increases a total surface area for thermal transfer of the pin 433.

In accordance with embodiments, each rib 911 can have a similar or different configuration as the other ribs 911. That is, each rib 911 can protrude from the local plane of the exterior surface 901 by a similar or different amount. In addition, while the ribs 911 of FIGS. 9, 10A and 10B are illustrated as being substantially parallel with the first or the second interior surfaces 431 or 432 and as being separated from one another by similar distances, embodiments exist in which the ribs 911 are not parallel with each other or with the first or the second interior surfaces 431 or 432 and/or in which the ribs 911 are separated by varying distances. In accordance with further embodiments, as shown in FIG. 10B, each rib 911 can be provided with additional, self-similar ribs 1001 that provide an additional increase in surface area.

As shown in FIGS. 11, 12A and 12B, the pins 433 have exterior surfaces 1101 with an overall tapered cylindrical shape. That is, the pins 433 each have a relatively wide base 1102 at the first or the second interior surface 431 or 432 and a relatively narrow distal tip 1103 (in the case of the pins 433 having the bridged configuration of FIGS. 5 and 7, the exterior surfaces 1101 of the pins 433 would have substantially cylindrical shapes). The distal tip 1103 can be curved and blunt. In any case, the pins 433 include first sections 1110, second sections 1120 and a fillet 1130 that is adjacent to the first or the second interior surface 431 or 432. Each second section 1120 is interposed between an adjacent first section 1110 and the first or the second interior surface 431 or 432 and the fillet 1130. While the exterior surfaces 1101 have an overall tapered cylindrical shape, the first sections 1110 each have a larger circumscribed diameter or a cross-sectional area A1 locally than the circumscribed diameter or the cross-sectional area A2 of the adjacent second section 1120 (see FIG. 12A). The different cross-sectional areas A1 and A2 can take the form of protrusions and smooth surfaces as will be described below.

In the embodiments of FIGS. 11, 12A and 12B, each first section 1110 is provided with a row of protrusions 1111 and each second section 1120 is provided as a smooth surface 1121 that effectively defines a local plane of the exterior surface 1101. As such, each protrusion 1111 effectively protrudes from the local plane of the exterior surface 1101 and correspondingly increases a total surface area for thermal transfer of the pin 4312.

In accordance with embodiments, each protrusion 1111 can have a similar or different configuration as the other protrusions 1111. That is, each protrusion 1111 can protrude from the local plane of the exterior surface 1101 by a similar or different amount. In addition, while the rows of protrusions 1111 of FIGS. 11, 12A and 12B are illustrated as being substantially parallel with the first or the second interior surfaces 431 or 432 and as being separated from one another by similar distances, embodiments exist in which the rows of protrusions 1111 are not parallel with each other or with the first or the second interior surfaces 431 or 432 and/or in which the rows of protrusions 1111 are separated by varying distances. In accordance with further embodiments, as shown in FIG. 12B, each protrusion 1111 can be provided with additional, self-similar protrusions 1201 that provide an additional increase in surface area.

With continued reference to FIGS. 4-12B and with additional reference to FIG. 13, the complex geometries of the pins 433 owing to the presence of the ribs 911 and the lands 921 of FIGS. 9, 10A and 10B and to the protrusions 1111 and the smooth surfaces 1121 of FIGS. 11, 12A and 12B can be formed by way of one or more additive manufacturing processes and/or other manufacturing technologies.

As shown in FIG. 13, a method of building a blade body of a turbine blade, such as the blade body 430 described above, is provided and includes manufacturing an interior surface (1301) and manufacturing one or more pins to extend from the interior surface (1302). The manufacturing is conducted such that the interior surface and the one or more pins are disposable to thermally interact with coolant directed through an interior of the blade body. In addition, at least one of the one or more pins is manufactured to include a first section and a second section, as described above, with the second section interposed between the first section and the interior surface and with the first section having a larger cross-sectional area than the second section.

Benefits of the features described herein are the provision of protrusions on pin-fins of a pin-fin array of a turbine blade of a gas turbine engine to significantly improve cooling by increasing the surface area available for heat transfer. Additionally, the increased surface area created by the protrusions may not increase the pressure drop across the system as much as would be done by decreasing the spacing between the pin-fins to achieve the same surface area. The size and/or the spacing of the protrusions can be varied across different pin-fins in order to obtain desired heat transfer and thermal gradients without affecting the air flow characteristics as much as by modifying the size and/or spacing in between the base pin-fins.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade body of a turbine blade, which defines an interior cavity fluidly communicative with coolant, the blade body comprising:

first and second interior surfaces; and
   one or more pins extending from the first interior surface toward the second interior surface,
   the first and second interior surfaces and the one or more pins being disposable to thermally interact with the coolant, and
   at least one of the one or more pins comprising a first section and a second section interposed between the first section and the interior surface with the first section having a larger cross-sectional area than the second section,
   wherein the at least one of the one or more pins comprises a tapered cylindrical exterior surface, a fillet that leads from the first interior surface to the tapered cylindrical exterior surface, a blunt distal tip that terminates at a distance from the second surface and one of:
   multiple ribs protruding from a local plane of the tapered cylindrical exterior surface along an axial length thereof between the fillet and the blunt distal tip; and
   multiple protrusions protruding in multiple rows from a local plane of the tapered cylindrical exterior surface along the axial length thereof exclusively between the fillet and the blunt distal tip.

2. The blade body according to claim 1, wherein the blade body comprises an exterior surface fluidly communicative with combustion products of a gas turbine engine.

3. The blade body according to claim 1, wherein the one or more pins extend between the first and second interior surfaces in a pin array.

4. The blade body according to claim 1, wherein the one or more pins extend as a first set of pins from the first interior surface in a first pin array and as a second set of pins from the second interior surface in a second pin array.

5. The blade body according to claim 1, wherein each of the multiple ribs comprises self-similar ribs protruding therefrom.

6. The blade body according to claim 1, wherein each of the multiple protrusions comprises self-similar protrusions protruding therefrom.

7. A turbine blade, comprising:
   a platform;
   a root extending radially inwardly from the platform; and
   a blade body extending radially outwardly from the platform,
   at least the blade body defining an interior cavity fluidly communicative with coolant,
   the blade body comprising first and second interior surfaces and one or more pins extending from the first interior surface toward the second interior surface,
   the first and second interior surfaces and the one or more pins being disposable to thermally interact with the coolant, and
   at least one of the one or more pins comprising a first section and a second section interposed between the first section and the interior surface with the first section having a larger cross-sectional area than the second section,
   wherein the at least one of the one or more pins comprises a tapered cylindrical exterior surface, a fillet that leads from the first interior surface to the tapered cylindrical exterior surface, a blunt distal tip that terminates and which terminates at a distance from the second surface and at least one of:
   multiple ribs protruding from a local plane of the tapered cylindrical exterior surface along an axial length thereof between the fillet and the blunt distal tip; and
   multiple protrusions protruding in multiple rows from a local plane of the tapered cylindrical exterior surface along the axial length thereof exclusively between the fillet and the blunt distal tip.

8. The turbine blade according to claim 7, wherein the platform, the root and the blade body define the interior cavity.

9. The turbine blade according to claim 7, wherein the blade body comprises an exterior surface fluidly communicative with combustion products of a gas turbine engine.

10. The turbine blade according to claim 7, wherein the one or more pins extend between the first and second interior surfaces in a pin array.

11. The turbine blade according to claim 7, wherein the one or more pins extend as a first set of pins from the first interior surface in a first pin array and as a second set of pins from the second interior surface in a second pin array.

12. The turbine blade according to claim 7, wherein each of the multiple ribs comprises self-similar ribs protruding therefrom.

13. The turbine blade according to claim 7, wherein each of the multiple protrusions comprises self-similar protrusions protruding therefrom.

14. A method of building a blade body of a turbine blade, the method comprising:
   manufacturing first and second interior surfaces; and
   manufacturing one or more pins to extend from the first interior surface toward the second interior surface,
   the first and second interior surfaces and the one or more pins being disposable to thermally interact with coolant directed through an interior of the blade body,
   at least one of the one or more pins being manufactured to comprise a first section and a second section interposed between the first section and the interior surface with the first section having a larger cross-sectional area than the second section,
   wherein the manufacturing of the at least one of the one or more pins comprises manufacturing the at least one of the one or more pins to comprise:
   a tapered cylindrical exterior surface, a fillet that leads from the first interior surface to the tapered cylindrical exterior surface, a blunt distal tip that terminates at a distance from the second surface and at least one of:
   multiple ribs protruding from the local plane of the tapered cylindrical exterior surface along an axial length thereof exclusively between the fillet and the blunt distal tip; and multiple protrusions protruding in multiple rows from the local plane of the tapered cylindrical exterior surface along the axial length thereof between the fillet and the blunt distal tip.

15. The method according to claim 14, wherein each of the multiple ribs comprises self-similar ribs protruding therefrom and each of the multiple protrusions comprises self-similar protrusions protruding therefrom.

\* \* \* \* \*